United States Patent
De Coene et al.

[15] 3,669,124
[45] June 13, 1972

[54] ANTI-DUST DEVICE FOR A COMBINE

[72] Inventors: Frans J. De Coene; Gilbert J. Strubbe, both of Zedelgem, Belgium

[73] Assignee: Clayson N.V., Zedelgem, Belgium

[22] Filed: Nov. 6, 1970

[21] Appl. No.: 87,507

[30] Foreign Application Priority Data

Nov. 14, 1969 Belgium..................................741666
Oct. 15, 1970 Belgium....................................50525

[52] U.S. Cl. .........................................................130/27 R
[51] Int. Cl. ........................................................A01f 12/18
[58] Field of Search .................130/27 R, 27 E, 27 F, 27 HA, 130/27 HF, 27 JT, 29

[56] References Cited

UNITED STATES PATENTS

| | | | |
|---|---|---|---|
| 2,367,990 | 1/1945 | Anderson et al. | 130/27 R |
| 1,750,083 | 3/1930 | Zaymusz | 130/27 HA |
| 813,957 | 2/1906 | Eisenhart | 130/27 E |

Primary Examiner—Antonio F. Guida
Attorney—Joseph A. Brown, John C. Thompson, James J. Kennedy and George C. Bower

[57] ABSTRACT

An anti-dust device for a combine having a feeder housing with a discharge end disposed adjacent to a threshing cylinder, the feeder housing including a conveyor for delivering crop material into the threshing cylinder. The anti-dust device includes a plate pivotally mounted transversely between the upper portion of the feeder housing and the threshing cylinder, thereby obstructing the movement of dust from the threshing cylinder back through the feeder housing. The plate is spring biased to normally assume a position in close proximity to the circumference of the threshing cylinder but is moveable outwardly therefrom by the engagement therewith of crop material rotating with the cylinder.

This invention relates to combines and more particular to anti-dust devices for controlling the internal flow of air having dust particles suspended therein.

23 Claims, 9 Drawing Figures

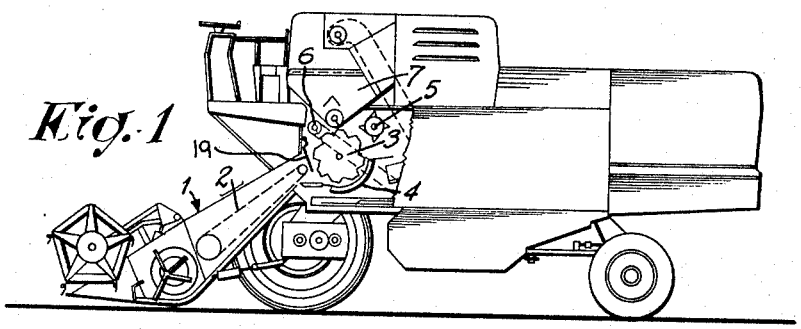
INVENTORS
FRANS J. DE COENE
GILBERT J. STRUBBE

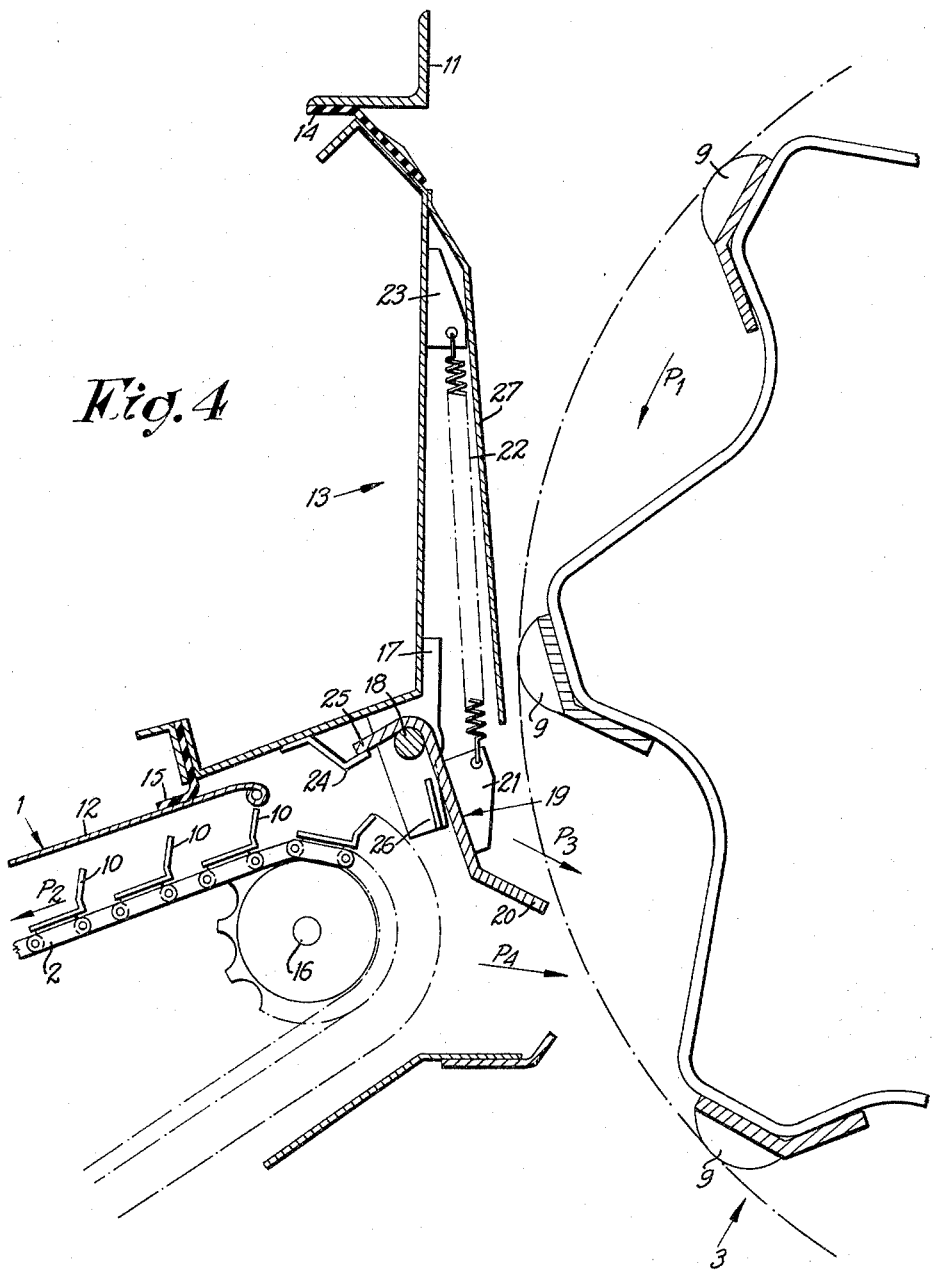

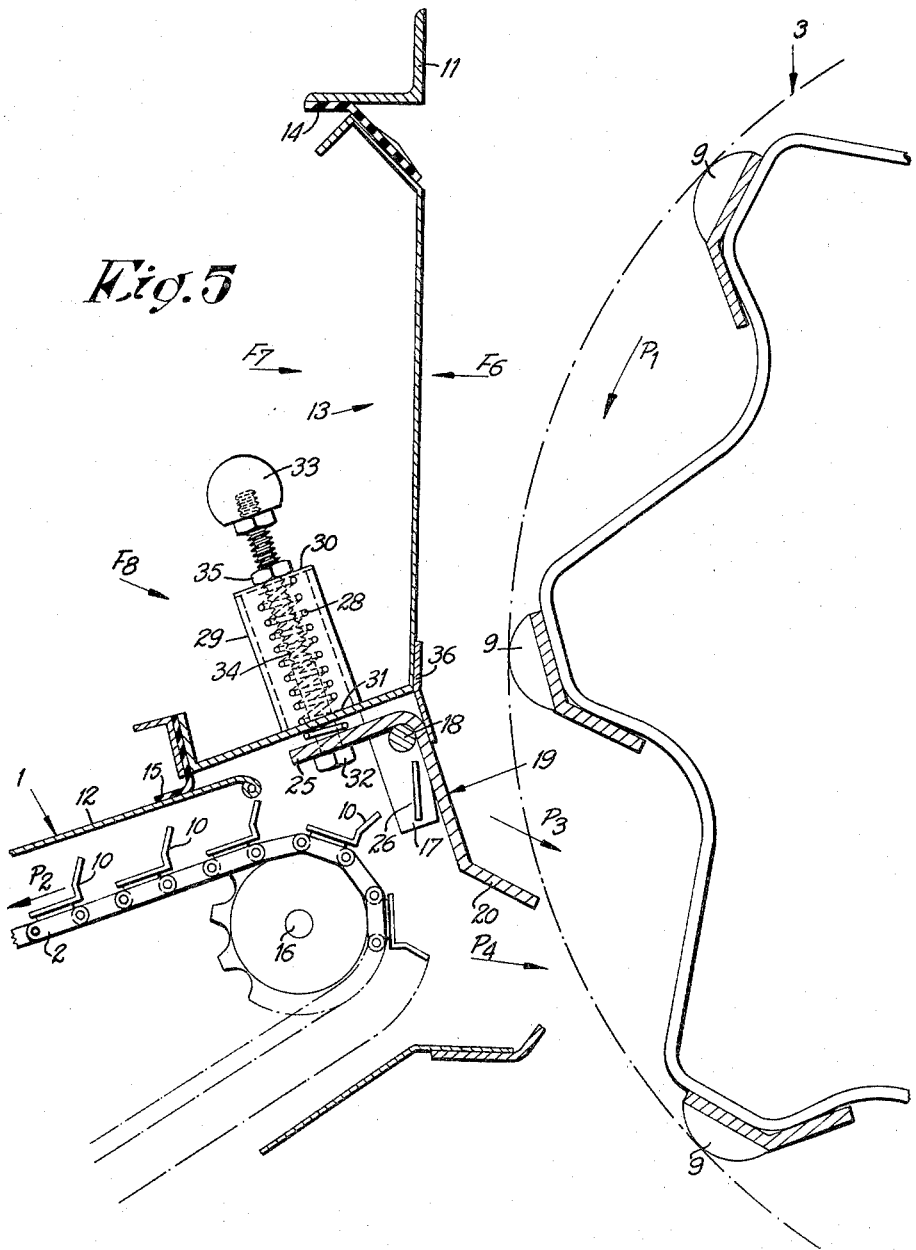

INVENTORS
FRANS J. DE COENE
GILBERT J. STRUBBE

ANTI-DUST DEVICE FOR A COMBINE

BACKGROUND OF INVENTION

In the past, the farm machinery industry has devoted much effort to improving the environmental conditions immediately surrounding the machine operator. One of the most menecing conditions faced by the combine operator is the large amounts of dust surrounding the machine, especially in the area of the operator's station. This dust tends to obscure the operator's vision and generally contributes to a very uncomfortable and inefficient environment in which to work. In the case of the combine, much of the dust can be attributed to that generated within the threshing cylinder and forced outwardly through the upper return portion of the feeder housing. In order to obstruct the movement of dust from the cylinder through the feeder housing, the prior art teaches the use of an anti-dust plate mounted in a fixed position between the cylinder and the discharge end of the feeder housing. Representative prior art is French Patent No. 1,426,734 having a priority date in Germany of Mar. 20, 1964 and British Patent No. 1,096,782 having complete specification published Dec. 29, 1967. However this teaching of the prior art has not been entirely satisfactory and, in fact, has numerous disadvantages.

It is well recognized that in order to prohibit the movement of dust through the feeder housing it is imperative that the anti-dust plate normally assume a position in relative close proximity to the circumference of the threshing cylinder. The fixed anti-dust plates of the prior art were limited in this respect because of the ever present possibility of crop material being carried along the circumference of the cylinder. If the fixed anti-dust plates were disposed very close to the circumference of the cylinder, choking or even structural damage to the cylinder or dust plate often resulted as there was insufficient clearance between the plate and cylinder for the carried crop material to pass.

SUMMARY OF INVENTION

Applicants' have devised a spring biased, moveably mounted anti-dust plate having a terminal edge which normally assumes a position in close proximity to the circumference of the threshing cylinder, but is yieldable outwardly therefrom as masses of crop material pass between the cylinder circumference and the anti-dust plate.

Moreover Applicants' realize there are other internal factors that inhibit the rearward movement of dust from the threshing cylinder. One of these is the presence of air from the straw beaters, located behind the threshing cylinder. Specifically, the air of the straw beaters integrates with the air of the cylinder, creating an overpressure region about the rear of the cylinder which inhibits the rearward movement of the dust from the cylinder. To correct this situation, Applicants' have disposed a deflector between the straw beaters and the threshing cylinder, the deflector having an angled terminal edge for directing the air associated with the beaters rearwardly, causing a suction effect which tends to draw the dust rearwardly. Also it is common to provide a clearance above the front portion of the cylinder for installation of a tailings divider auger. It is quite possible that the turbulance associated with the tailings auger reduces the air velocity within the cylinder and consequently reduces the rear suctional effect caused by the presence of the anti-dust plate. Therefore Applicants have provided a guide plate between the tailings auger and the cylinder to guide the stream of air around the cylinder and avoid the turbulant interference caused by the air associated with the auger.

It is therefore the primary object of the present invention to provide a moveably mounted anti-dust plate biased to assume a position relatively close to the circumference of the cylinder, whereby the plate may be forced outwardly therefrom by crop material passing between the cylinder and plate.

Another object of the present invention is to provide an anti-dust plate disposed about the feeder housing opening in close proximity to the circumference of the threshing cylinder in order to create a pressure differential or suctional effect that tends to induce the dust rearwardly out of the combine.

A further object of the present invention is to provide guide means about the circumference of said threshing cylinder for separating the air flow therein from outside sources which tend to interfere with the flow of air in the cylinder.

Other objects and advantages of the present invention will become apparent and obvious from a study of the following description and the accompanying drawings which are merely illustrative of the present invention.

DESCRIPTION OF THE DRAWINGS

FIGS. 1 – 3 are side elevational views of a combine with portions cut away to illustrate the anti-dust plate and other related components.

FIG. 4 is an enlarged fragmentary side elevation view of the anti-dust plate showing a first embodiment.

FIG. 5 is an enlarged fragmentary side elevation view of the anti-dust plate showing a second embodiment.

DESCRIPTION OF PREFERRED EMBODIMENT

Figure 6:
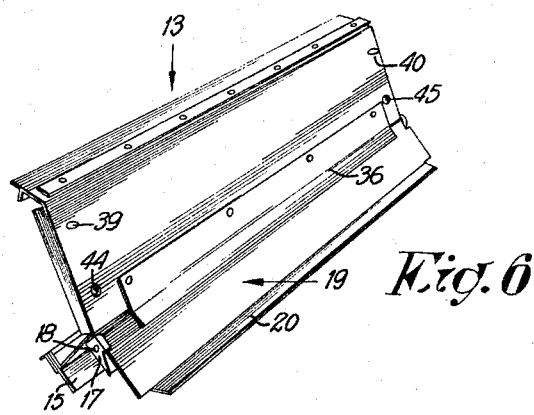
FIG. 6 is a perspective view of the cover with the anti-dust plate affixed thereto.
Figure 7:
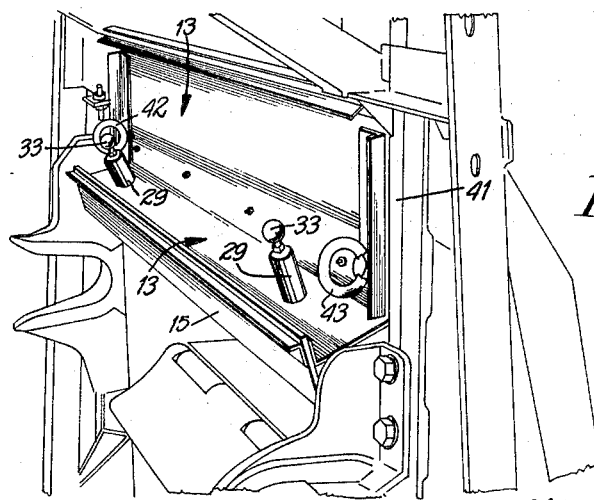
FIG. 7 is a perspective view of the anti-dust plate shown in FIG. 6 mounted to the combine frame.

In FIGS. 1 – 3, the parts are indicated in a schematical way which are directly in relation with the anti-dust equipment according to the invention. These are the straw elevator 1, the proper straw elevator chain 2, cylinder 3, concave 4, beater 5, tailings auger 6, grain tank 7, and a spring biased anti-dust plate 19.

Cylinder 3 turns according to arrow P1 (FIG. 4), and is provided in a traditional way with non-reflected threshing bars; the straw elevator chain 2 displaces according to arrow P2 and is also provided in a known way with suitable driving elements; straw beater 5 turns according to arrow P7 (FIG. 9); the air flow which is deflected by the aforesaid plate 19, and directed in the cylinder, is reflected by arrow P3, and the sucked air flow from elevator 1 is reflected by arrow P4.

As reflected in FIGS. 1 – 3 an anti-dust plate 19 is simply formed by a bent plate, installed between the cylinder 3 on one hand and the opening between the upper part of straw elevator chain 2 and the upper part of straw elevator 1 on the other hand.

In FIG. 4, an execution is reflected of an anti-dust equipment according to the invention. The cylinder 3 turns according to arrow P1 and is provided with bars 9, whilst the straw elevator 2 turns according to arrow P2 and is provided with driving elements 10. Cylinder cover 13 is detachably installed between part 11 of the frame in which the threshing mechanism is installed on one hand and the upper side 12 of the housing of straw elevator 1. This cover 13 mainly consists of a bent plate in a suitable shape which covers the opening between the aforesaid elevator housing and the corresponding upper wall 11 of the frame in which the threshing mechanism is installed. The fixation of this plate will be described in detail further in the text.

At the upper end, the aforesaid cylinder cover 13 is provided with a rubber strip 14, whereas a rubber strip 15 is installed at the lower end of cover 13. These rubber strips cover the whole width of the cover 13 and are installed such that they fold away and butt with the aforesaid part 11 on one hand and with the corresponding part of the upperwall 12 of straw elevator 1 on the other hand. By the use of such sealings which easily wrinkle, the elevator can always pivot around upper shaft 16.

On this cover 13, supports 17 are installed on suitable locations according to the invention, in which a shaft 18 is rotatably journalled. On this shaft, the proper anti-dust plate 19 is fixed for example by welding, by which the free extreme end or terminal edge 20 of this anti-dust plate forms an angle with the tangent of the cylinder circumference.

On this plate 19, which covers the whole width of the cylinder, at least one support 21 is installed which is connected with the end of a tension spring 22, by which the second extreme end of this spring is connected with a support 23, fixed on a part of the aforesaid plate 13 which is situated more to the top.

On the lower part of the aforesaid plate or cover 13, a stop 24 is fixed with which the free extreme end 25 of the anti-dust plate 19-20 can coordinate in order to determine the position of the anti-dust plate which is the closest to cylinder 3, in other words the proper working position, while on the aforesaid supports 17, stops 26 are applied with which the anti-dust plate 19 can coordinate when it would be pushed to the rear for one or another reason, in other words when it would rotate to the rear around shaft 18.

The function of the anti-dust equipment according to FIG. 4 is very simple and as follows: The dust movement is directed according to arrow P1 due to the fact that this dust moves with the turning direction of cylinder 3. This dust will bend over when it comes in contact with the anti-dust plate 19–20 by the presence of part 19, on one hand, and part 20 on the other hand, whereby the dust has a movement direction according to arrow P3, in other words through cylinder 3. When straw for example turns with the cylinder, plate 19 will deviate by turning around shaft 18 up to the moment that it butts the stop 26. At this moment, there is enough clearance between the cylinder circumference on one hand and the anti-dust plate on the other hand in order to feed the conveyed material so that there will be no deformation or rupture of the anti-dust plate 19–20 and cylinder blocking is avoided. As a matter of fact, one or both stops 24 and 26 can eventually be made adjustable by which the distance between the cylinder circumference and the anti-dust plate can be adjusted. Such an adjustment can for example be formed in a very simple way by applying an adjusting screw in one or both stops 24 and 26.

Because the air flow, according to arrow P3 has a high velocity, there will be a reduced pressure in the supply opening of the elevator caused by the shape of the anti-dust plate and the fact that the latter is closely installed to the cylinder circumference by which the dust, present in this clearance is sucked according to arrow P4 in the threshing mechanism so that the dust movement towards the header by the straw elevator chain is avoided. By means of tests, one has experienced that plate 19–20 — in order to obtain this suction operation — must be installed close to the cylinder circumference which was formerly impossible because of the previous mentioned reasons. Indeed, it is quite possible in this execution to make the distance very small between the free end 20 of the anti-dust plate and the cylinder circumference 3 without the presence of the above-mentioned disadvantages as it was the case with the traditional machines.

Another execution is reflected in FIG. 5 by which the aforesaid tension springs 22 are replaced by tension springs 28, for example two. The latter are installed in a closed bushing 29 which is secured on the lower part of the aforesaid cover 13. The springs 28 press with one end against the upper wall 30 of such a bushing and pass through a suitable passage 31 in the aforesaid corresponding part of cover 13 in order to press with their second end on part 25 of anti-dust plate 19–20. This plate is also fixed in this case on shaft 18 which is installed in supports 17 on which stops 26 are applied. As a matter of fact, shaft 18 can be rotatively journalled in the straw elevator housing 1 or in the combine frame.

These springs 28 continuously press the anti-dust plate towards the cylinder by which this movement is limited by the head of bolts 32 installed through the springs and which are provided towards their free extreme end with a hand grip 33.

The bolt body 34 is secured on a specific location towards bushing 29 by means of a counter nut 35. In this way, it is provided that the location of the bolt head 32 is adjustable towards bushing 29 so that the displacement of the anti-dust plate 19 is made adjustable in this respect. One also obtains in this way, that the springs are completely installed outside the threshing mechanism housing. The hand grip 33 only aims at simplifying the installation and disassembly of cover 10. Finally, a guide plate 36 is installed to cover 13 by which a continuous transition is obtained between the cylinder cover 13 on one hand and the anti-dust plate 19–20 on the other hand so that material accumulation is avoided between the anti-dust plate and cover 13.

Figure 8:
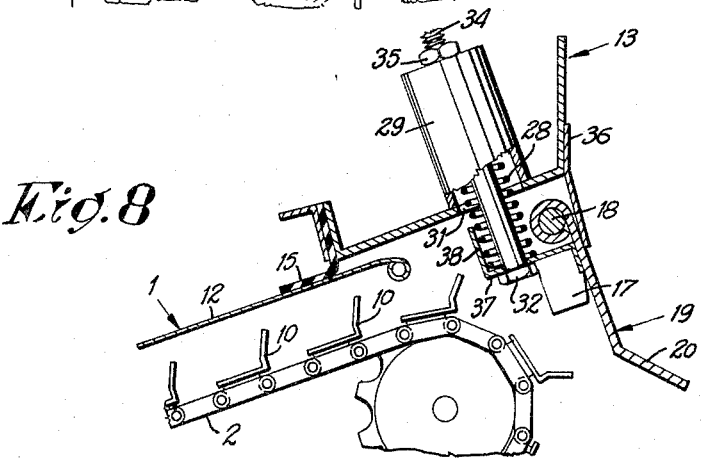
FIG. 8 is a fragmentary side elevational view illustrating a modification of the anti-dust plate shown in FIG. 5.

In the execution variant according to FIG. 8, an extension 37 is installed on the anti-dust plate 19–20 which is provided with a part 38 directed upwards, by which it is obtained that the free extreme end of this part 38 replaces the aforesaid stop 26.

Finally, the stops 26 and 38 assure that the anti-dust plate 19 does not get in touch with elevator chain 2, particularly with the driving elements 10.

The installation and removal of the aforesaid cover 13 is also very simple and as follows: Extensions, respectively 39 and 40 are applied on the rear side of plate 13 which can coordinate with holes which are installed in the concerned girders 41 of the machine in order to automatically install the latter in the right place during the installation of the cover while the proper fixation is carried out by means of eye bolts, wing screws or the like, respectively 42 and 43 of which the bodies are installed through the holes, respectively 44 and 45 in cover 13.

The function of the anti-dust plate 19–20 is always the same with a difference that only the disposition of the retracting springs, on one hand and the disposition of the stops of such anti-dust plate, on the other hand differ in the described executions. In this way, one obtains an anti-dust plate which can closely be installed to the cylinder circumference without the risk of crop accumulation, deformation or rupture of specific parts and by which this plate cannot come into contact with other moving parts of the combine, especially the cylinder and/or straw elevator chain.

Finally, the shape and the installation of an anti-dust plate cause a reduced pressure at the location of the straw elevator supply opening so that the dust in the elevator is also sucked in the machine.

Figure 9:
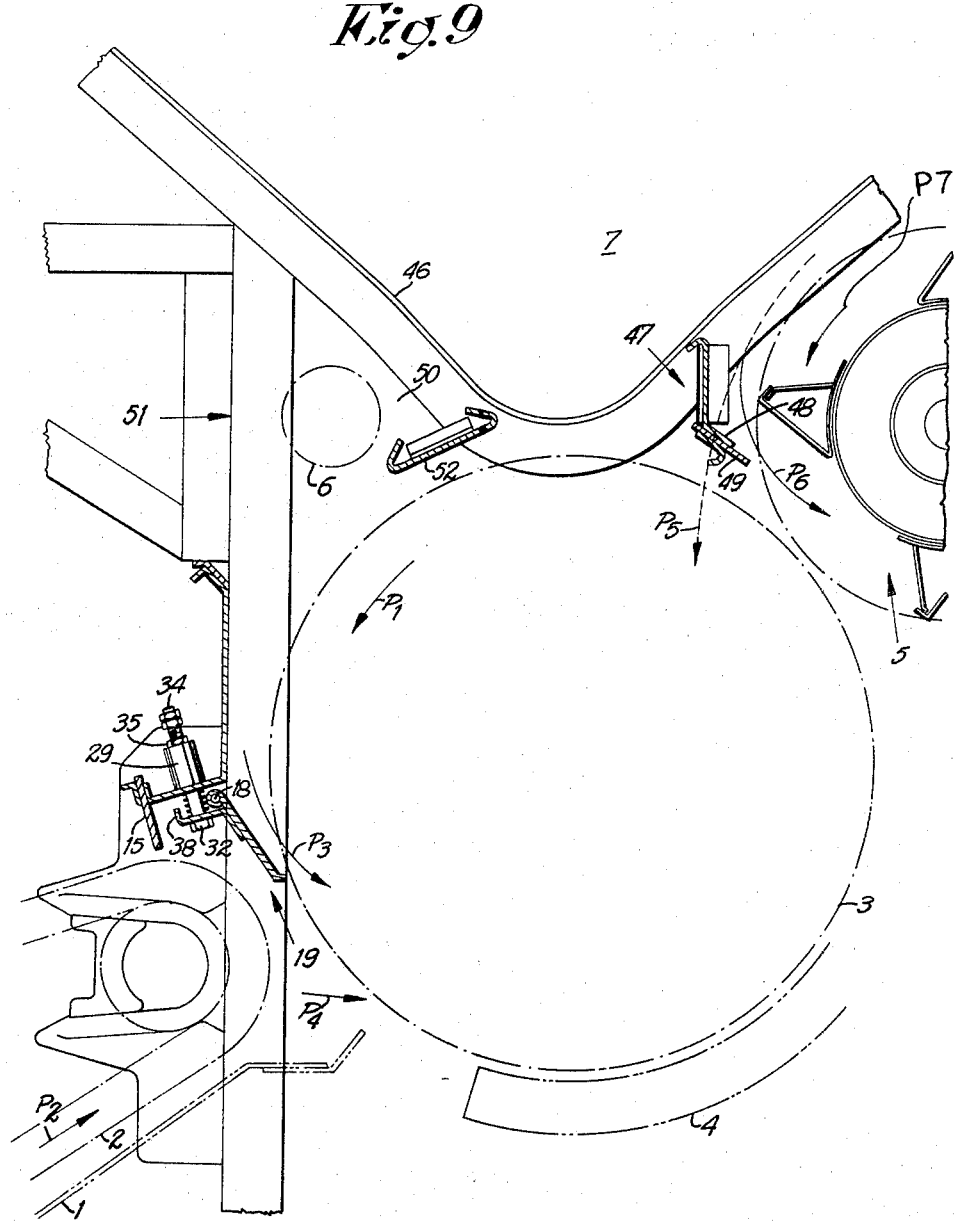
FIG. 9 is an enlarged fragmentary side elevational view taken in the direction of F9 of FIG. 3 showing the anti-dust plate and other related components of the present invention.

With particular reference to FIG. 9, the straw beater 5 caused by a rotating air flow which in case no precautions are taken, is directed according to arrow P5 because such an air flow is conducted along the bottom of grain tank 7. By the presence of such an air flow P5, we have an over-pressure in the location of the rear half of cylinder 3, by which the speed of air flow P3 is obstructed as well as suction P4 as a consequence of this.

In order to exclude this obstruction, one foresees according to the invention in front of the straw beater and especially between this beater, cylinder 3 and grain tank bottom 46, a deflected plate 47 which is fixed between the sides of the frame of the combine, by which this plate shows a bent lower wall 48 to which a strip of elastic material 49, for instance a strip rubber is fixed. The free edge of this strip is applied as close as possible to the straw beater circumference.

By the shape and the installation of this deflector plate 47, the air flow which circulates around straw beater 5 is deflected and directed to the rear according to arrow P6, between the blades of the straw beater by which the creation of the aforesaid overpressure is avoided as a consequence of air flow P5. In this way any obstruction of the circulating air flow which is caused by straw beater 5 towards air flow P3 and P4, is avoided so that the speed of the air flow P3 becomes greater as well as the suction according to arrow P4 as a consequence of this.

In order to avoid the air vortexes which come into existence in the location of clearance 50 between the bottom of the grain tank 7 and the front wall 51 of the combine frame, i.e., the clearance area where the tailings auger 6 is applied, a guide plate 52 is disposed on top of cylinder 3 and behind it and somewhat underneath the aforesaid auger 6. This plate is installed about the surrounding elements such that on one hand it hinders the passage of the air flow in the direction of the tailings auger 6 by which the existence of the vortexes are voided, and on the other hand that it directs the air flow to the front and downwards in the direction of the springy suspended anti-dust plate 19. The distance between the aforesaid plate 52, and the cylinder circumference is preferably not smaller than the distance between the aforesaid cylinder circumference and the most adjacent point of grain tank bottom 46.

In this way, the vortexes, caused by the shape of the aforesaid clearance 50 in which tailings auger 6 is applied are considerably decreased, by which the air speed according to arrow P3 is once again stepped up. At the same time, this results in an increase of the suction force which is exercised in the elevator housing 1 according to arrow P4. Finally, we obtain in this way that the air flow P3 and air flow P4 become maximum by which all dust and chaff are kept, respectively sucked into the threshing mechanism.

The terms, "upper," "lower," "forward," "rearward" etc., have been used herein merely for the convenience of the foregoing specification and in the appended claims to describe the anti-dust device and its parts as oriented in the drawings. It is to be understood, however, that these terms are in no way limiting to the invention since the anti-dust plate may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. An anti-dust device for a combine harvester of the type having a rotatable threshing cylinder, comprising in combination: a frame; a concave mounted within said frame; a threshing cylinder rotatably mounted within said frame; crop feeding means supported by said frame in front of said threshing cylinder and having its discharge end disposed adjacent to the threshing cylinder for feeding crop material thereto, said threshing cylinder being operable upon rotation to sweep material conveyed toward said cylinder by said crop feeding means downwardly and rearwardly across said concave for threshing of said crop material; and an anti-dust device mounted adjacent a forward portion of said cylinder, and above the discharge end of the crop feeding means, said anti-dust device having a movable edge normally biased to assume a position in close proximity to the threshing cylinder circumference, whereby said anti-dust device normally obstructs the movement of dust carried over the threshing cylinder back through the crop feeding means, said movable edge being yieldable outwardly from said cylinder circumference as crop material carried over the threshing cylinder passes therebetween.

2. The anti-dust device as recited in claim 1 wherein said anti-dust device is fixed to a rotatable shaft disposed adjacent said cylinder.

3. The anti-dust device as recited in claim 2 wherein a cover is interposed between said frame and said feeder means and includes support means affixed thereto in which said shaft is properly journalled for rotative movement.

4. The anti-dust device as recited in claim 3 wherein the anti-dust device is comprised of a plate-like structure extending transversely the width of said threshing cylinder and including an edge portion angled toward said cylinder and in the normal biased position terminating in close proximity to the circumference of the cylinder.

5. The anti-dust device as recited in claim 4 wherein stop means are provided for limiting the range of movement thereof.

6. The anti-dust device as recited in claim 5 wherein said stop means are adjustable.

7. The anti-dust device as recited in claim 5 wherein said stop means for limiting the outward movement of said anti-dust device away from said cylinder includes extension means mounted to said shaft supports.

8. The anti-dust device as recited in claim 5 wherein said stop means for limiting the movement of said anti-dust device inwardly toward the cylinder includes extension means fixed to said cover.

9. The anti-dust device as recited in claim 1 wherein said biased means includes a tension spring connected at one end to said anti-dust device and connected at the other end at a distant point.

10. The anti-dust device as set forth in claim 1, wherein a bushing is fixed to a cover about an opening therein and a coil spring extending through said opening is compressively held between said anti-dust device and the end of said bushing, whereby the pressure of said coil spring against said anti-dust device biases it inwardly toward the cylinder circumference, said cover extending between said frame and said feeder means.

11. The anti-dust device as recited in claim 10, wherein a bolt assembly is axially disposed through said coil spring and bushing and extends through said anti-dust device, whereby the normal distance between said anti-dust device and said cylinder circumference can be selectively varied.

12. The combination as set forth in claim 1 wherein additional air guiding means are disposed adjacent the cylinder circumference for directing the flow of air about the vacinity of the threshing cylinder.

13. The combination as set forth in claim 12 wherein straw beaters are disposed rearwardly of the cylinder and deflector means are interposed between said straw beaters and cylinder for directing the flow of air associated with said beaters rearwardly away from the flow associated with the rotating cylinder, thereby avoiding the high pressures resulting from an integration of the two different air flows which would significantly inhibit the rearward flow of dusty air from the threshing cylinder.

14. The anti-dust device as recited in claim 12 wherein a clearance is formed over the upper front portion of the cylinder for housing a tailings auger and wherein a guide plate is mounted between said threshing cylinder and said tailings auger for guiding the flow of air along the circumference of said cylinder, thereby separating the turbulant air of the tailings auger from the air of the threshing cylinder.

15. The combination as set forth in claim 13 wherein said deflector means disposed adjacent said straw beaters are resilient, whereby said deflector means may move outwardly from the circumference of the straw beaters in response to engagement therewith of straw being carried by said beaters.

16. The combination as set forth in claim 15 wherein said deflector means includes a terminal edge angled toward the circumference of said straw beaters.

17. The combination as set forth in claim 16 wherein said terminal edge includes a resilient material such as rubber.

18. In a combine having a frame, a threshing cylinder rotatively mounted within said frame, a feeder housing disposed forwardly of said threshing cylinder, a conveyor operatively contained within said feeder housing for delivering crop material to said cylinder, and a anti-dust plate disposed transversely between said threshing cylinder and said feeder housing for prohibiting the movement of dust from the cylinder through the feeder housing, the improvement comprising: providing said anti-dust plate with a moveable terminal edge angled inwardly toward the circumference of said cylinder for turning the dusty air rearwardly, creating a suctional effect which tends to force the air rearwardly out of the combine, said terminal edge being moveable outwardly away from the cylinder circumference as masses of crop material enter between the anti-dust plate and cylinder, thereby avoiding choking or structural failure of the dust plate, cylinder, or other adjacent components.

19. The combination as set forth in claim 18 wherein said plate is rotatable about a transverse axis spaced forwardly of said cylinder and moveable thereabouts from a normal position closely adjacent the cylinder circumference to a position outwardly therefrom said wherein said plate is biased to maintain a normal position in close proximity to the cylinder circumference.

20. The combination as set forth in claim 19 wherein said plate is spring biased.

21. The combination as set forth in claim 18 wherein the combine further includes straw beaters disposed rearwardly of said cylinder and a tailings auger disposed across the upper front portion of the threshing cylinder, the improvement further comprising: a deflector means mounted between said straw beaters and said cylinder and having a terminal edge angled inwardly toward the circumference of said straw beaters for directing the air flow of the straw beaters rearwardly, avoiding interference with the air flow of the cylinder and inducing dusty air rearwardly out of the combine; and a guide means mounted between said tailings auger and said cylinder for separating the turbulant air associated with the tailings auger from that of the cylinder.

22. The combination as set forth in claim 21 wherein the terminal edge of said deflector means is comprised of resilient material.

23. The anti-dust device as recited in claim 1 wherein said crop feeding means is an undershot conveyor means, said anti-dust device being disposed in between said cylinder and the discharge end and upper run of said undershot conveyor means.

* * * * *